United States Patent
Yang et al.

(10) Patent No.: US 7,042,602 B1
(45) Date of Patent: May 9, 2006

(54) IMAGE CORRECTION APPARATUS AND RECORDING MEDIUM HAVING IMAGE CORRECTION PROGRAM

(75) Inventors: Juping Yang, Kawasaki (JP); Yukio Nakagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 886 days.

(21) Appl. No.: 09/584,268

(22) Filed: Jun. 1, 2000

(30) Foreign Application Priority Data

Jun. 3, 1999 (JP) ................... 11-157165

(51) Int. Cl.
G06F 13/00 (2006.01)

(52) U.S. Cl. ............ 358/518; 358/522; 358/3.26; 358/525; 358/447; 382/275; 382/167; 382/254; 382/162; 348/252; 355/77

(58) Field of Classification Search ............ 358/518, 358/522, 3.26, 525, 447; 382/275, 167, 254, 382/162; 348/252; 355/77
See application file for complete search history.

(56) References Cited

U.S. PATENT DOCUMENTS

| | | | | |
|---|---|---|---|---|
| 4,641,959 A | * | 2/1987 | Terashita | 355/77 |
| 5,216,521 A | * | 6/1993 | Birgmeir | 358/447 |
| 5,357,352 A | * | 10/1994 | Eschbach | 358/518 |
| 5,544,258 A | * | 8/1996 | Levien | 382/169 |
| 5,812,286 A | * | 9/1998 | Lin | 358/519 |
| 6,040,860 A | * | 3/2000 | Tamura et al. | 348/252 |
| 6,507,667 B1 | * | 1/2003 | Hsieh et al. | 382/167 |
| 6,522,432 B1 | * | 2/2003 | Lin | 358/475 |

* cited by examiner

Primary Examiner—Edward L. Coles
Assistant Examiner—Alan Rahimi
(74) Attorney, Agent, or Firm—Oliff & Berridge, PLC

(57) ABSTRACT

An image correction apparatus includes: an image obtaining unit that obtains image data from outside constituted of a plurality of pixels each having a value in a color component among a plurality of color components; an average value calculation unit that calculates average values of color component values corresponding to individual color components in the image data; and a correction unit that corrects the color component values of individual pixels to match the average values of the color component values corresponding to individual color components with at least one specific reference value.

1 Claim, 6 Drawing Sheets

IMAGE CORRECTION APPARATUS AND RECORDING MEDIUM HAVING IMAGE CORRECTION PROGRAM

INCORPORATION BY REFERENCE

The disclosure of the following priority application is herein incorporated by reference:
Japanese Patent Application No. 11-157165 filed Jun. 3, 1999

BACKGROUND OF THE INVENTION

1. Field of the Invention

The present invention relates to a color fog correction apparatus that corrects a color fog manifesting over, for instance, a photographic image that has become discolored after having been printed onto photographic printing paper or after having been stored over a long period of time on film, a photographic image obtained through a photographing operation performed under undesirable illumination conditions or exposure conditions and the like, and it also relates to a machine-readable recording medium having an image color fog correction program recorded therein.

2. Description of the Related Art

A color fog may occur in a photographic image obtained through an image-capturing operation performed with a camera due to undesirable illumination conditions, incorrect exposure conditions or the like. A color fog may also occur when a photographic image printed on photographic printing paper has become discolored. Such a color fog may adversely affect the color tone of the photographic image, causing it to turn reddish or greenish. The undesirable phenomena regarding color of a photographic image described above are referred to as "color fog" in this specification.

A color-fogged image is corrected, for instance, by estimating the spectrum of the illuminating light and applying to the image a filter of a color that is complementary to the color of the illuminating light, by exposing the three colors separately over different lengths of time when printing the image onto photographic printing paper and thus adjusting the degrees of color development to achieve color correction or by performing exposure correction to adjust the volumes of data corresponding to the three colors during digital processing to achieve color correction in the prior art.

However, there is a problem with the method of color correction in the prior art achieved by estimating the color of the illuminating light and applying a filter to the image of a color that is complementary to the color of the illuminating light in that it is difficult to accurately estimate the characteristics of the illuminating light. In addition, even if the characteristics of the illuminating light are accurately determined, there is a problem in that it costs a great deal of money to provide complementary color filters. This cost-related problem is not limited to hardware filters. When employing software filters, too, the cost of measuring a plurality of illuminating lights by using a reference chart to create filter data corresponding to a plurality of light colors is significant.

In addition, the color correction method achieved through exposure correction, which utilizes filters and necessitates correct lengths of exposure time to be allowed for the three colors, is costly and requires a great length of time for processing.

SUMMARY OF THE INVENTION

An object of the present invention is to provide a simple and convenient color fog correction apparatus capable of effectively correcting a color-fogged image and to provide a recording medium having an image color fog correction program recorded therein.

In order to attain the above object, an image correction apparatus according to the present invention comprises: an image obtaining unit that obtains image data from outside constituted of a plurality of pixels each having a value in a color component among a plurality of color components; an average value calculation unit that calculates average values of color component values corresponding to individual color components in the image data; and a correction unit that corrects the color component values of individual pixels to match the average values of the color component values corresponding to individual color components with at least one specific reference value.

In this image correction apparatus, it is preferred that the correction unit uses one common reference value for the plurality of color components as the reference value. In this case, it is preferred that the correction unit sets a value achieved by further averaging the average values of the color component values corresponding to individual color components as the common reference value. Or, it is preferred that the correction unit sets a maximum value among the average values of the color component values corresponding to individual color components as the common reference value.

Also, it is preferred that the image correction apparatus further comprises a stage value calculation unit that determines three or more stage values between the average value of the color component values and a specified reference value for each of the plurality of color components, a number of stage values being identical to each other among the plurality of color components, and
the correction unit respectively sets stage values having an common order number among the plurality of color components as reference values for the plurality of color components and corrects color component values of individual pixels to match the average values of the color component values corresponding to individual color components with the reference values set for the individual color components.

Also, it is preferred that the correction unit fixes a maximum value and a minimum value of the color component values corresponding to individual color components not to be corrected and corrects color component values between the maximum value and the minimum value by using a specific function.

Another image correction apparatus according to the present invention comprises: an image obtaining unit that obtains image data from outside constituted of a plurality of pixels each having a value in a color component among a plurality of color components; a histogram preparation unit that prepares a histogram for each of the color components using the image data; an average value calculation unit that calculates an average value of the histogram; and a histogram conversion unit that creates new image data by converting the histogram so that an average value of a histogram resulting from the conversion matches a specified reference value.

An image correction apparatus according to the present invention comprises: an image obtaining unit that obtains image data from outside constituted of a plurality of pixels each having a value in a color component among a plurality of color components; a histogram preparation unit that prepares a histogram for each of the color components using the image data; an average value calculation unit that calculates an average value of the histogram; and a stage value calculation unit that sets at least three stage values between each of the averages value and a specified reference value; and a histogram conversion unit that converts the histogram so that an average value of a histogram resulting from the conversion matches a stage value having a common order number among the plurality of the color components.

In the above image correction apparatuses, it is preferred that the average value corresponds to a barycentric value of the histogram.

Also, it is preferred that the histogram conversion unit converts the histogram by using an interpolation function.

A recording medium according to the present invention records a control program used in an image correction apparatus. The control program comprises: an instruction for obtaining image data from outside constituted of a plurality of pixels each having a value of a color component among a plurality of color components; an instruction for calculating average values of color component values each corresponding to one of the color components using the image data; and an instruction for correcting the color component values of the pixels to match the average values of the color component values with a specific reference value.

A data signal according to the present invention embodied in a carrier wave comprises a control program used in an image correction apparatus. The control program comprises: an instruction for obtaining image data from outside constituted of a plurality of pixels each having a value of a color component among a plurality of color components; an instruction for calculating average values of color component values each corresponding to one of the color components using the image data; and an instruction for correcting the color component values of the pixels to match the average values of the color component values with a specific reference value.

DESCRIPTION OF THE PREFERRED EMBODIMENTS

Embodiment 1

Figure 5:
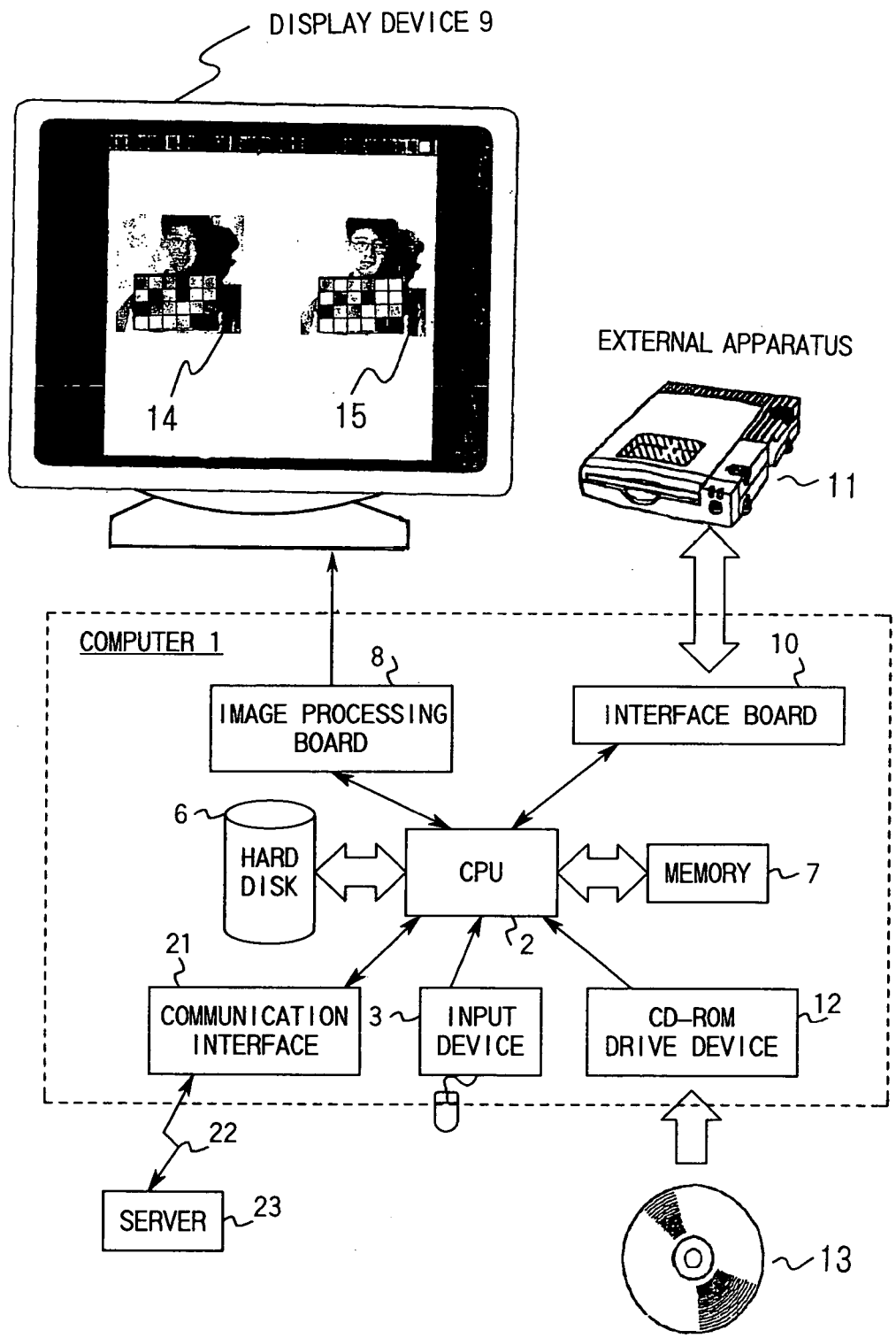
FIG. 5 is the schematic block diagram of the hardware configuration of the present invention.

The overall structure of the image correction apparatus in this embodiment of the present invention that employs a computer is shown in FIG. 5.

In FIG. 5, a computer 1 is provided with a CPU (microprocessor) 2. An input device 3 constituted of a keyboard, a mouse and the like, a hard disk 6, a memory 7, an image processing board 8 and an interface board 10 are connected to the CPU 2. A display device is connected to an image output terminal of the image processing board 8. An external apparatus 11 such as an external recording medium is connected to the interface board 10. A CD-ROM drive device 12 is connected to the CPU 2, and a CD-ROM 13 for recording an image correction program and an installation program to install the color correction program is inserted at the CD-ROM drive device 12.

Using the installation program in the CD-ROM 13, the CPU 2 expands the image color fog correction program in the CD-ROM 13 and stores it in an execution-enabled state at the hard disk 6.

The image color fog correction apparatus in this embodiment is achieved based upon a hypothesis that the average color of an object is, by nature, gray. Namely, when illuminating light of a multiple component spectrum is irradiated on an object and the spectral reflectances over the entire surface of the subject are averaged, the average spectral reflectance achieves a flat distribution with respect to wavelength. Thus, we tend to perceive the averaged color of the entire surface of the object as the color of the illuminating light.

Based upon this hypothesis, we made the following inference. The averaged color of an object irradiated by illuminating light with a completely flat spectrum must have a flat spectrum as well. Assuming that the color of an object, i.e. the color of its image, with a flat spectrum on average irradiated by illuminating light with a completely flat spectrum is the most pleasing to the human eye, if an overall average color of the image is a color of gray corresponding to a flat spectrum, the color of the image is equivalent to a color of an image irradiated by a light source having a flat spectrum and, therefore, should be a pleasing color tone. In other words, if the overall average color of the image is not gray, correction should be implemented to adjust the overall average color to gray, which corresponds to a flat spectrum, i.e., to equalize the individual average values of the histograms corresponding to the individual color components so that any undesirable effect of illuminating light with a non-flat spectrum or any undesirable effect of incorrect exposure or discoloration can be removed from the image. We reached the above observation through a concentrated effort in research, and this embodiment is implemented based upon the concept outlined above.

Figure 1:
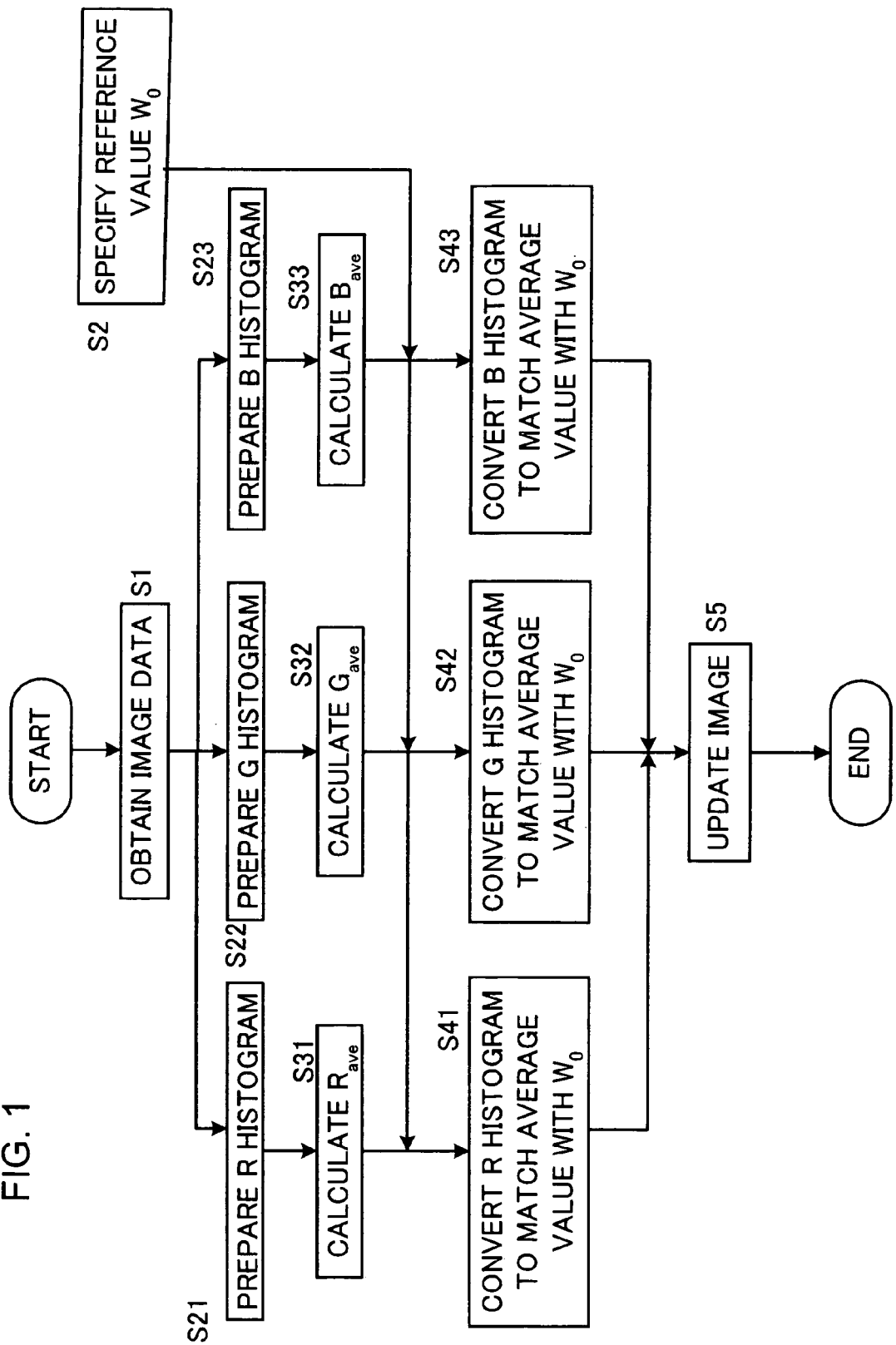
FIG. 1 is a flowchart of the operation performed in the essential portion of the image correction apparatus in the embodiment 1 of the present invention.

FIG. 1 is a flowchart of the operation achieved in the image color fog correction apparatus in the embodiment 1 of the present invention. The following is an explanation of the image correction operation, given in reference to the step numbers in FIG. 1.

First, when the user starts up the image color fog correction program, the CPU2 opens an image file to undergo the correction and obtains the image data (S1).

Next, histograms corresponding to the individual color components, i.e., the R, G and B color components, are prepared using the image data (S21, S22 and S23). Then, histogram average values $R_{ave}$, $G_{ave}$ and $B_{ave}$ corresponding to the individual color components R, G and B are calculated (S31, S32 and S33). Before proceeding to the next phase, the user specifies a reference value $W_0$ (S2). The specific method of $W_0$ specification is to be detailed later.

During the next phase, the individual histograms obtained in steps S21, S22 and S23 are converted so that the individual converted histogram average values match the reference value $W_0$ (S41, S42 and S43). The details of the conversion method are to be given later. The image obtained at this time point is designated as a corrected image, and the image is updated (S5).

Since the individual histogram average values corresponding to the color components R, G and B each match the reference value $W_0$ in the image that has been corrected as described above, a pleasing color tone that is equivalent to the color tone of an image illuminated with flat illuminating light is achieved.

The individual histogram average values $R_{ave}$, $G_{ave}$ and $B_{ave}$ corresponding to the color components R, G and B of the image in embodiment 1 explained above are calculated as follows.

$$R_{ave} = \sum F_R(x) \cdot P_R(x)$$
$$G_{ave} = \sum F_G(x) \cdot P_G(x)$$
$$B_{ave} = \sum F_B(x) \cdot P_B(x)$$

expression 1

In the mathematical expressions above, x represents the brightness level of the image and is normally equivalent to 8-bit data having a minimum value of 0 and a maximum value of 255, and Σ represents addition of values regarding 0 of x through 255 of x.

$P_R$ (x), $P_G$ (x) and $P_B$ (x) each represents the ratio of the number of pixels at the brightness level x to the entire number of pixels in the corresponding color component R, G or B in the image.

$F_R$ (x), $F_G$ (x) and $F_B$ (x) are each an arbitrary function of x. These functions may each be expressed as x, $x^2$, $(x-x_w)^2$ or the like. $x_w$ represents the barycenter of a given histogram, and is equivalent to $W_R$, $W_G$ and $W_B$ to be detailed later. Of these functions, $$F_R(x)=F_G(x)=F_B(x)=x$$

expression 2 is particularly desirable, and when it is used, the individual average values $R_{ave}$, $G_{ave}$ and $B_{ave}$ respectively match the barycentric values $W_R$, $W_G$ and $W_B$ of the corresponding histograms to validate relationships expressed as $R_{ave}=W_R$, $G_{ave}=W_G$ and $B_{ave}=W_B$.

In addition, in embodiment 1, the reference value $W_0$ should preferably assume the average value of the average values of the histograms corresponding to the individual color components, i.e., $W_0=(R_{ave}+G_{ave}+B_{ave})/3$ or the maximum value among the average values of the histograms corresponding to the individual color components, i.e., $W_0=\max(R_{ave}, G_{ave}, B_{ave})$.

If the average value is used, an advantage is achieved in that an image faithful to the original is achieved through correction, whereas an advantage is achieved in that a dark original image is brightened through the correction when the maximum value is used.

In embodiment 1, the conversion for equalizing the average values of the histograms corresponding to the individual color components to a specified value S (the specified value S is equivalent to the reference value in embodiment 1 and equivalent to a kth level value in embodiment 2 which is to be detailed later) is achieved by using an interpolation function. An interpolation function represented by a polygonal line (FIG. 6A) or a curve (FIG. 6B) shown in FIG. 6A or 6B may be used for the conversion. It is desirable to use a curve, e.g., a quadratic function that achieves simplicity and convenience, to smoothly convert gradation levels.

Figure 6A:
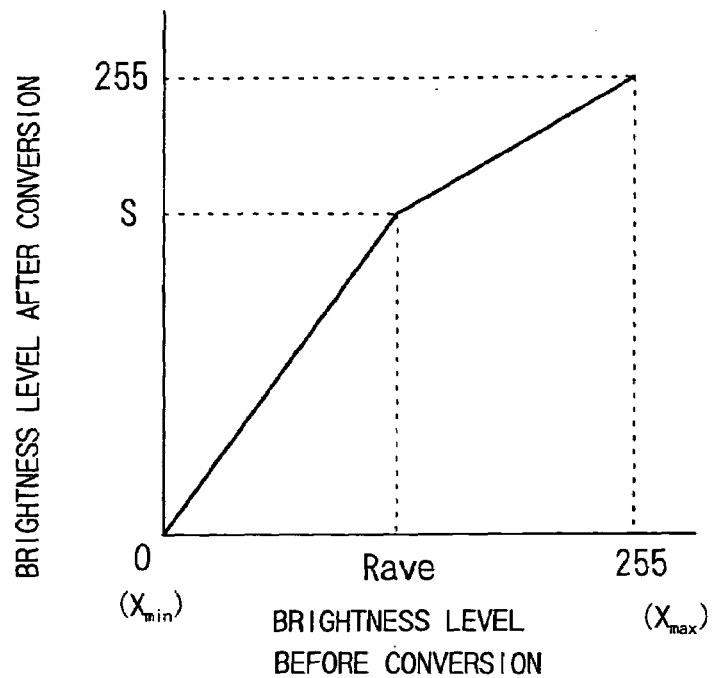
FIGS. 6A and 6B present interpolation functions that may be used in the histogram conversion.
Figure 6B:
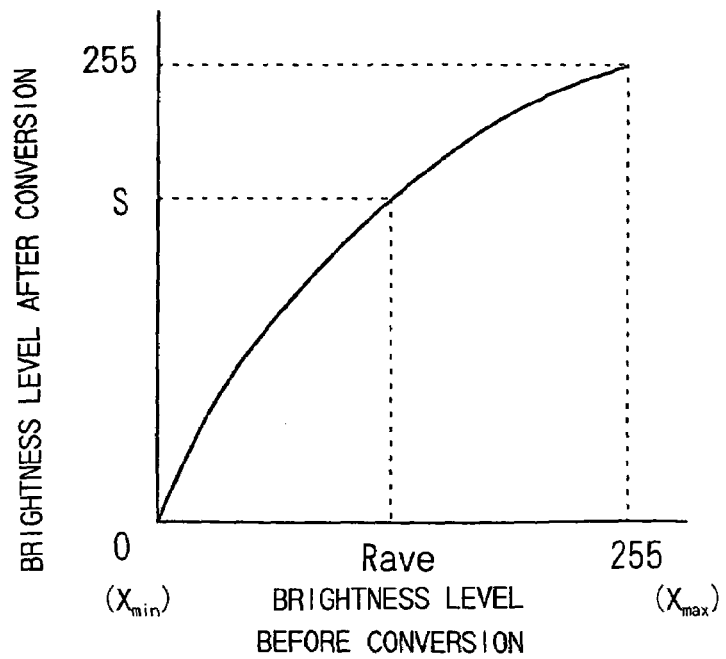

While FIGS. 6A and 6B present histograms of the color component R, the other color components are represented in a similar manner. In FIGS. 6A and 6B, $x_{min}$, $x_{max}$ and $R_{ave}$ respectively represent the minimum value, the maximum value and the average value of the brightness levels before the conversion.

Furthermore, in embodiment 1, a reference value may be specified in S2 by setting it in advance, or it may be input by the user each time.

Figure 3:
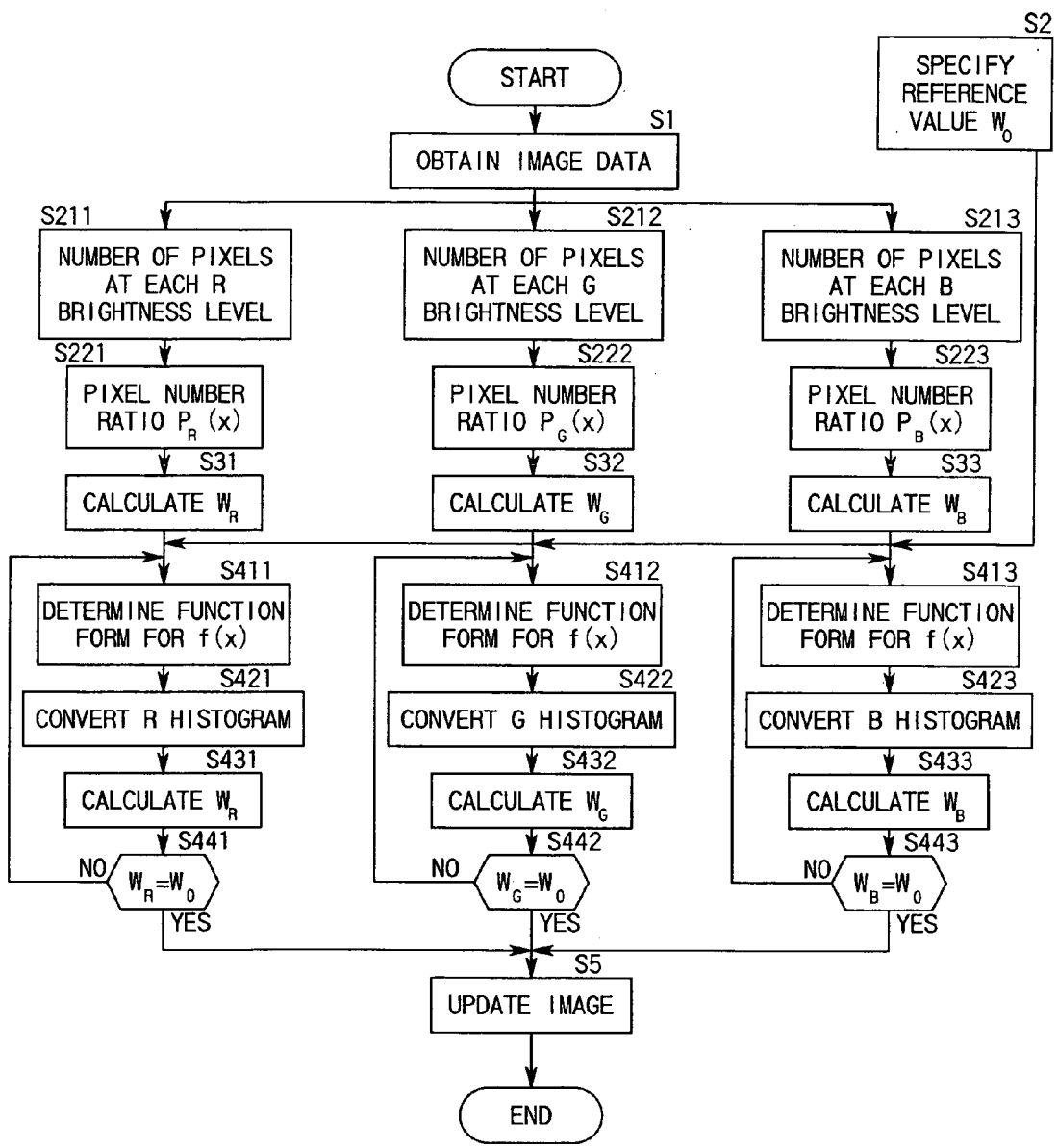
FIG. 3 is a flowchart of the operation performed in the essential portion of the image correction apparatus in the example 1 of the present invention.

Embodiment 1 is explained in further detail in reference to the flowchart in FIG. 3.

First, when the user starts up the image color fog correction program, the CPU 2 opens the image file to undergo the correction and obtains the image data (S1).

Next, the number of pixels at each brightness level in the image is calculated for each color component (S211, S212 and S213).

Then, the ratios $P_R$ (x), $P_G$ (x) and $P_B$ (x) each representing the ratio of the number of pixels at each brightness level in the image to the entire number of pixels are calculated for the individual color components to obtain corresponding histograms (S221, S222 and S223). In other words, obtaining (preparing) a histogram means ascertaining the ratio of the number of pixels at each brightness level to the entire number of pixels. It is to be noted that the number of pixels at each brightness level may be ascertained instead.

Next, the average values are calculated using expressions 1 and 2 during the phase that includes S31, S32 and S33. The average values $R_{ave}$, $G_{ave}$ and $B_{ave}$ of the individual histograms thus obtained constitute the barycentric values of the histograms and from this point onward they are referred to as $W_R$, $W_G$ and $W_B$.

The reference value $W_0$ is specified before proceeding to the next phase (S2).

Next, the histograms obtained in S221, S222 and S223 are converted so that the barycentric values of the converted histograms match the reference value $W_0$ specified in S2.

More specifically, the conversion is implemented as follows.

While the conversion is implemented by using a quadratic function in this implementation, another function may be used instead. The quadratic function f(x) is defined as;

$$f(x)=ax^2+bx+c$$

expression 3 with a, b and c each representing a constant.

The histogram of the color component R is now undergoing the conversion, with the minimum value, the maximum value and the barycentric value of the brightness levels respectively set to 0, 255 and $W_R$.

These values are then incorporated through substitution in expression 3, and f(x) is set to 0, 255 and $W_0$ respectively in correspondence to 0, 255 and $W_R$ assumed for x. As a result, the relationships expressed as;

$$f(0)=c=0$$

expression 4

$$f(255)=ax255^2+bx255+c=255$$

expression 5 and $$f(W_R)=aW_R^2+bW_R+c=W_0$$

expression 6 are achieved.

a, b and c are ascertained by solving the tertiary linear equations (three unknowns) above, i.e., expressions 4, 5 and 6, to determine the function form of f(x) (S411).

The processing described above is also performed on the histogram of the color component G and the histogram of the color component B undergoing the conversion in parallel independently of each other, and thus, the function forms of f(x) are independently determined in correspondence to the individual histograms (S412 and S413).

Next, using the f(x) thus determined, the histogram of the color component R is converted. In more specific terms, with x representing a given brightness level before the conversion, each brightness level in the new histogram resulting from the conversion is calculated by using f(x). During this process, the pixel number ratio at the brightness level x is converted to a pixel number ratio corresponding to the brightness level f(x). The histogram is converted through this processing (S421).

In other words, during a histogram conversion, the values at individual levels between the maximum value and the minimum value are corrected using a specific function while leaving the maximum value and the minimum value of the level on the horizontal axis in the histogram undergoing the conversion unchanged. In the example shown in FIG. 6B, the brightness level 0 and the brightness level 255 remain unchanged, and the intermediate level, i.e., the brightness level 128, is corrected to a slightly larger value, e.g., to approximately the brightness level 180. If there are 100 pixels at the brightness level 128 before the histogram conversion, there will be approximately 100 pixels at the brightness level 180 after the histogram conversion although there may be an error in quantization. To rephrase this, a histogram conversion is achieved by shifting the histogram to the right or left while slightly changing the shape of the histogram with the maximum value and the minimum value of the level on the horizontal axis of the histogram fixed.

The processing described above is also performed in parallel on the histogram of the color component G and the histogram of the color component B, to convert the individual histograms (S422 and S423).

After the histograms corresponding to R, G and B are converted in this manner, barycentric values $W_R$, $W_G$ and $W_B$ are calculated for the converted histograms as in the processing performed in S31, S32 and S33 (S431, S432 and S433).

Next, a decision is made as to whether not the barycentric values $W_R$, $W_G$ and $W_B$ are each equal to $W_0$ (S441, S442 and S443).

If they are equal to $W_0$ (YES), the operation proceeds to the next phase.

If a negative decision is made (NO), on the other hand, the operation returns to S411, S421 or S431 to repeat the loop described above until all the barycentric values are equalized to $W_0$ by further converting the converted histogram.

When an affirmative decision (YES) is made in all S414, S424 and S434, the image is updated (S5) before ending the processing.

Embodiment 2

Since the structure of the correction apparatus in embodiment 2 is identical to that assumed in embodiment 1, its explanation is omitted.

In the image color fog correction, the gray color hypothesis is valid as in embodiment 1. However, when the hypothesis that the most pleasing image is achieved when the illuminating light has a flat spectrum and is a prerequisite of embodiment 1 is not valid, i.e., when the subject is illuminated under illumination conditions manifesting a unique color tone, the apparatus in this embodiment corrects a color fog. In this situation, the average color of the image is not gray. For instance, an image of Mount Fuji at sunset or a landscape image photographed under water may be corrected through embodiment 2. In the former case, the illuminating light is bound to be reddish even though the average reflectance of Mount Fuji, which is the subject, may manifest a flat spectrum. In other words, it is the reddish illuminating light that we hold in memory as a lasting impression. Under these circumstances, it is not desirable to implement the correction method in embodiment 1, since the impression of the original scene becomes lost. In embodiment 2, a color fog is corrected by taking into consideration such unique characteristics of a particular illuminating light.

Figure 2:
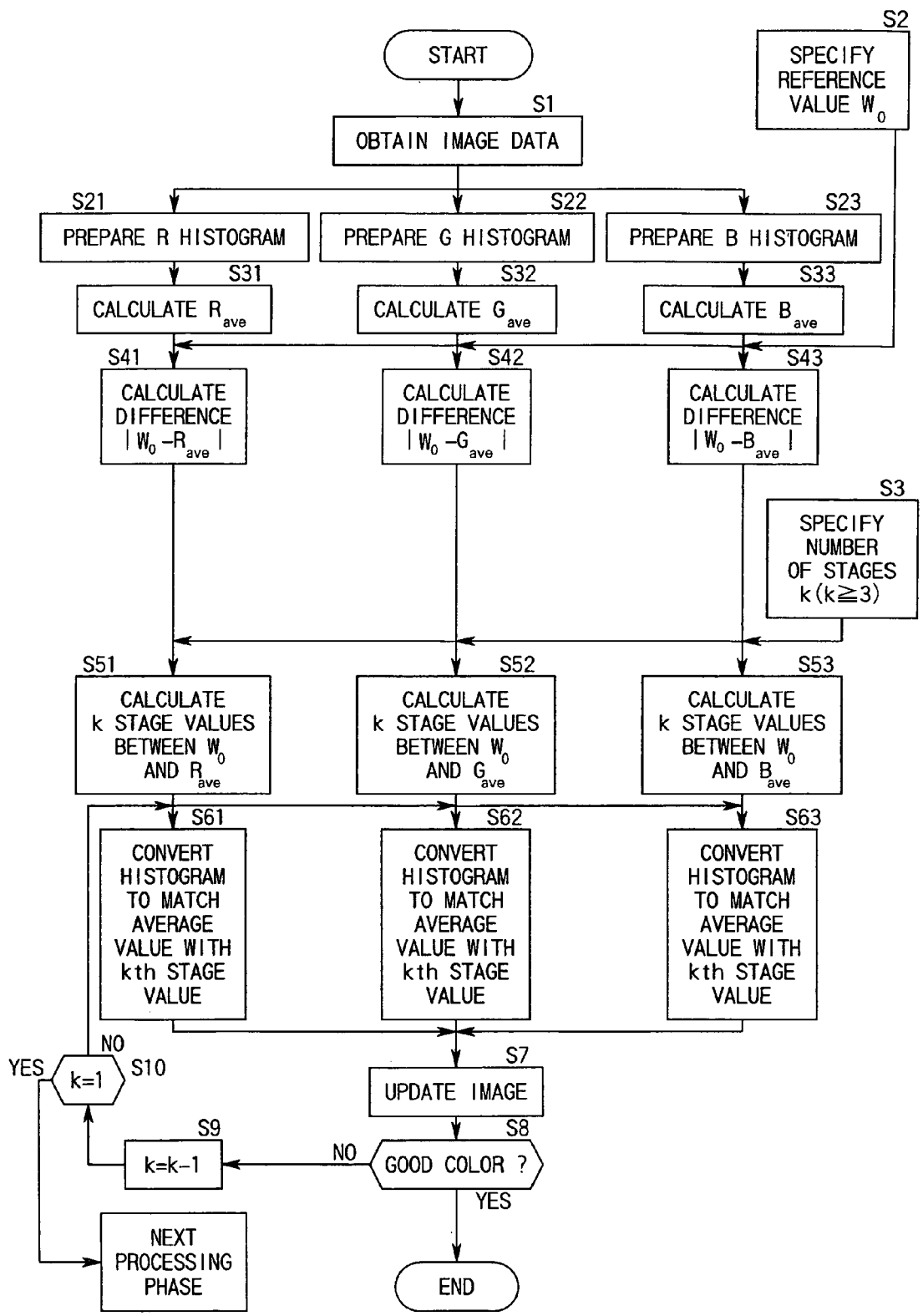
FIG. 2 is a flowchart of the operation performed in the essential portion of the image correction apparatus in the embodiment 2 of the present invention.

FIG. 2 is a flowchart of the operation achieved in the image color fog correction apparatus in embodiment 2 of the present invention.

The following is an explanation of the image correction operation, given in reference to the step numbers in FIG. 2.

First, when the user starts up the image color fog correction program, the CPU 2 opens an image file to undergo the correction and obtains the image data (S1).

Next, histograms corresponding to the individual color components, i.e., the R, G and B color components, are prepared using the image data (S21, S22 and S23).

Then, histogram average values $R_{ave}$, $G_{ave}$ and $B_{ave}$ corresponding to the individual color components R, G and B are calculated (S31, S32 and S33).

Before proceeding to the next phase, the user specifies a reference value $W_0$ (S2).

During the next phase, differences $|W_0-R_{ave}|$, $|W_0-G_{ave}|$ and $|W_0-B_{ave}|$ between the reference value $W_0$ and the individual average values calculated during the preceding phase are calculated (S41, S42 and S43).

Before proceeding to the next phase, the user specifies the number of stages k ($k \geq 3$) to be set between the individual average values ($R_{ave}$, $G_{ave}$, $B_{ave}$) and $W_0$ (S3).

During the next phase, k stage values are sequentially calculated between each of the average values ($R_{ave}$, $G_{ave}$, $B_{ave}$) and $W_0$ (S51, S52 and S53). At this point, the individual first stage values are designated as average values, and the individual kth stage values are each designated as a common reference value $W_0$ for the corresponding color components.

Next, the individual histograms are converted so that the average values of the converted histograms match the corresponding kth stage values (S61, S62 and S63).

Next, the image is updated (S7). In the next step, an evaluation is performed to determine whether not the color of the image is good (S8). If an affirmative decision is made (YES/good color), the processing ends.

If a negative decision is made (NO/poor color), the value of k is reduced by one (S9). Next, a decision is made as to whether or not the reduced value of k is equal to 1 (S10). Since a negative decision (NO/k≠1) is invariably made in the first loop, the operation returns to the phase that includes S61, S62 and S63 to convert the individual histograms so that the average values of the converted histograms become equal to the kth stage values after k is decremented by one and then the image is updated in S7 before making a decision in S8 as to whether or not the color is good.

If an affirmative decision is made (YES/good color) in S8, the processing ends. If a negative decision is made (NO/poor color), the operation proceeds to S10 via S9 to make a decision as to whether or not k=1 is true. If a negative decision is made (NO/k≠1), the operation returns to the phase that includes S61, S62 and S63 to engage in the operation explained above.

If, on the other hand, an affirmative decision is made (YES/k=1), it means that the current stage value corresponds to the average value of the histogram of the original image, and the operation shifts to one of the three processing phases described below.

In the first processing phase, at least either the reference value $W_0$ set in S2 or the number of stages k set in S3 is changed before performing the processing in FIG. 2 again.

In the second processing phase, the processing ends without updating the image.

In the third processing phase, the operation shifts to a processing phase not shown in the flowchart in FIG. 2.

In this embodiment, the number of stages may be specified in S3 by setting it in advance or it may be input by the user each time.

In addition, the k stage values assumed between each of the average values ($R_{ave}$, $G_{ave}$, $B_{ave}$) and $W_0$ should be preferably set over equal intervals.

In embodiment 2, and the individual average values $R_{ave}$, $G_{ave}$ and $B_{ave}$ of the histograms corresponding to the color components R, G and B in the image are calculated, the reference value $W_0$ is set, the histograms of the individual color components are converted to equalize their average values to the specified value S and the reference value is specified in S2, all as in embodiment 1, and thus, their explanation is omitted.

Figure 4:
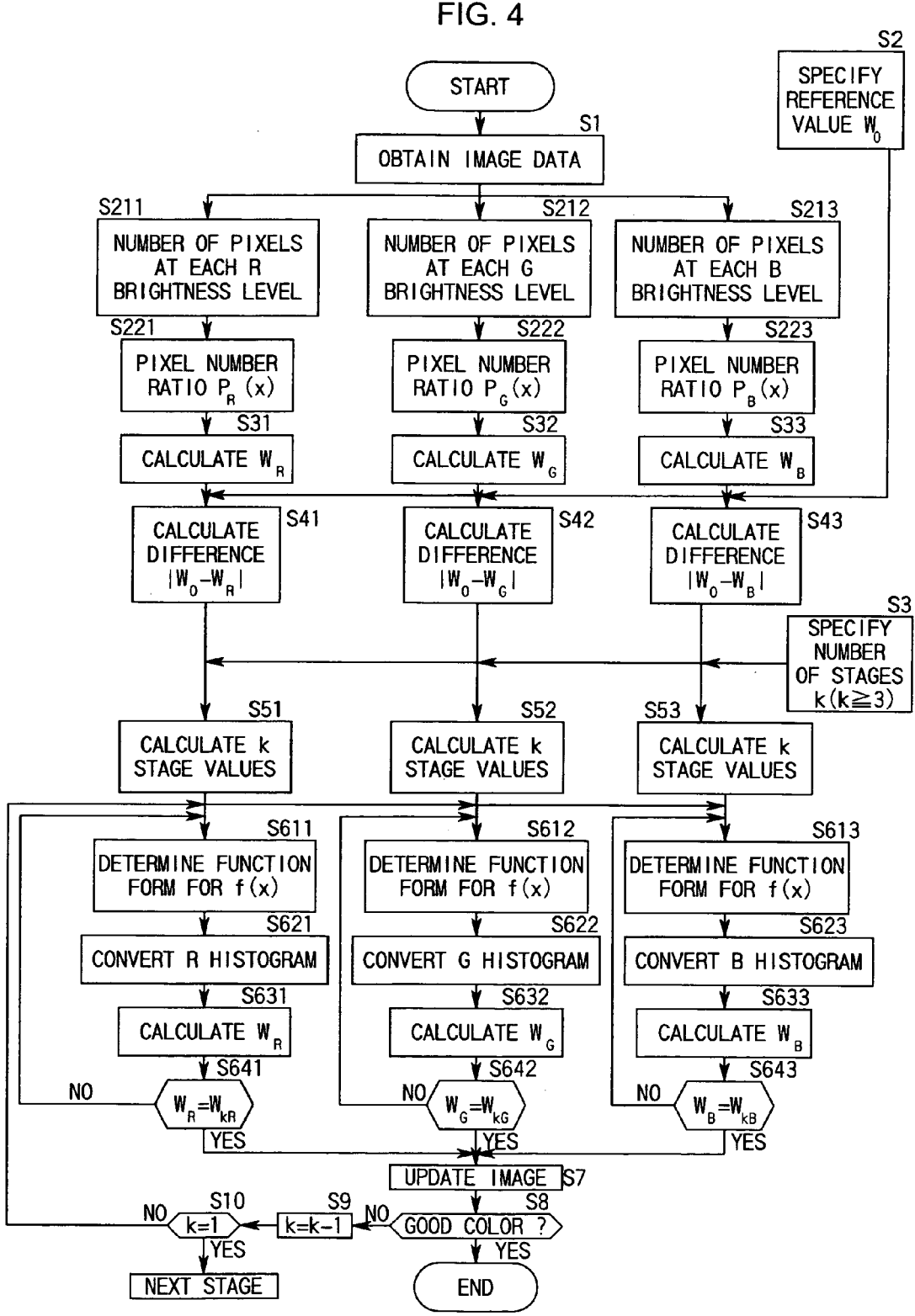
FIG. 4 is a flowchart of the operation performed in the essential portion of the image correction apparatus in example 2 of the present invention.

Embodiment 2 is explained in further detail in reference to the flowchart in FIG. 4. First, when the user starts up the image color fog correction program, the CPU 2 opens the image file to undergo the correction and obtains the image data (S1).

Next, the number of pixels at each brightness level in the image is calculated for each color component (S211, S212 and S213).

Then, the ratios $P_R(x)$, $P_G(x)$ and $P_B(x)$ each representing the ratio of the number of pixels at each brightness level in the image to the entire number of pixels are calculated for the individual color components to obtain corresponding histograms (S221, S222 and S223).

Next, the average values are calculated using expressions 1 and 2 during the phase that includes S31, S32 and S33. The average values $R_{ave}$, $G_{ave}$ and $B_{ave}$ of the individual histograms thus obtained constitute the barycentric values of the histograms and from this point onward there are referred to as $W_R$, $W_G$ and $W_B$.

The reference value $W_0$ is specified before proceeding to the next phase (S2).

At the next phase, differences $|W_0-W_R|$, $|W_0-W_G|$ and $|W_0-W_B|$ between the reference value $W_0$ and the individual barycentric values calculated during the preceding phase are calculated (S41, S42 and S43).

Before proceeding to the next phase, the user specifies the number of stages k ($k \geq 3$) to be set between the individual barycentric values ($W_R$, $W_G$, $W_B$) and $W_0$ (S3).

During the next phase, k stage values $W_{KR}$, $W_{KG}$ and $W_{KB}$ are sequentially calculated between each of the barycentric values ($W_R$, $W_G$, $W_B$) and $W_0$ (S51, S52 and S53). At this point, the individual first stage values are designated as barycentric values and the individual kth stage values are designated as reference values $W_0$ for the corresponding color components.

Next, the individual histograms are converted so that of the barycentric values of the converted histograms match the corresponding kth stage values ($W_{KR}$, $W_{KG}$ and $W_{KB}$).

More specifically, the conversion is implemented as follows.

While the conversion is implemented by using a quadratic function in this implementation, another function may be used instead. The quadratic function f(x) is defined as;

$$f(x)=ax^2+bx+c \quad \text{expression 7}$$

with a, b and c each representing a constant.

The histogram of the color component R is now undergoing the conversion, with the minimum value, the maximum value and the barycentric value of the brightness levels respectively set to 0, 255 and $W_R$.

These values are then incorporated through substitution in expression 7, and f(x) is set to 0, 255 and $W_{KR}$ respectively in correspondence to 0, 255 and $W_R$ assumed for x. As a result, the relationships expressed as;

$$f(0)=c=0 \quad \text{expression 8}$$

$$f(255)=a \times 255^2+b \times 255+c=255 \quad \text{expression 9 and}$$

$$f(W_R)=aW_R^2+bW_G+c=W_{KR} \quad \text{expression 10 are achieved.}$$

a, b and c are ascertained by solving the tertiary linear equations (three unknowns) above, i.e., expressions 8, 9 and 10, to determine the function form of f(x) (S611).

The processing described above is also performed on the histogram of the color component G and the histogram of the color component B undergoing the conversion in parallel, independently of each other, and thus, the function forms of f(x) are independently determined in correspondence to the individual histograms (S612 and S613).

Next, using the f(x) thus determined, the histogram of the color component R is converted. In more specific terms, with x representing a given brightness level before the conversion, each brightness level in the new histogram after the conversion is calculated by using f(x). During this process, the pixel number ratio at the brightness level x is converted to the pixel number ratio corresponding to the brightness level f(x). The histogram is converted through this processing (S621).

The processing described above is also performed in parallel on the histogram of the color component G and the histogram of the color component B, to convert the individual histograms (S622 and S623).

After the histograms corresponding to R, G and B are converted in this manner, barycentric values $W_R$, $W_G$ and $W_B$ are calculated for the converted histograms as in the processing performed in S31, S32 and S33 (S631, S632 and S633).

Next, a decision is made as to whether not the barycentric values $W_R$, $W_G$ and $W_B$ are respectively equal to $W_{KR}$, $W_{KG}$ and $W_{KB}$ (S641, S642 and S643).

If they are equal to $W_{KR}$, $W_{KG}$ and $W_{KB}$ (YES), the operation proceeds to the next phase, respectively.

If a negative decision is made (NO), on the other hand, the operation returns to S611, S621 or S631 to repeat the loop described above until the converted barycentric values are equalized to $W_{KR}$, $W_{KG}$ and $W_{KB}$ respectively through further conversion.

When an affirmative decision (YES) is made in all S641, S642 and S643, the image is updated (S7). In the next step, an evaluation is performed to determine whether or not the color of the image is good (S8). If an affirmative decision is made (YES/good color), the processing ends.

If a negative decision is made (NO/poor color), the value of k is reduced by one (S9). Next, a decision is made as to whether or not the reduced value of k is equal to 1 (S10).

Since a negative decision (NO/k≠1) is invariably made in the first loop, the operation returns to the phase that includes S611, S612 and S613 to determine the function forms of f(x) for the individual color components corresponding to the kth stage values after k is decremented by 1 and the operation proceeds through the phase that includes S621, S622 and S623, the phase that includes S631, S632 and S633 and the phase that includes S641, S642 and S643 before the image is updated in S7 and a decision is made as to whether or not the color is good in S8.

If an affirmative decision is made (YES/good color) in S8, the processing ends. If a negative decision is made (NO/poor color), the operation proceeds to S10 via S9 to make a decision as to whether or not k=1 is true.

If a negative decision is made (NO/k≠1), the operation returns to the phase that includes S611, S612 and S613 to engage in the operation explained above.

If, on the other hand, an affirmative decision is made (YES/k=1), it means that the current stage value corresponds to the average value of the histogram of the original image, and the operation shifts to one of the three processing phases described below.

In the first processing phase, at least either the reference value $W_0$ set in S2 or the number of stages of k set in S3 is changed before performing the processing in FIG. 4 again.

In the second processing phase, the processing ends without updating the image.

In the third processing phase, the operation shifts to a processing phase not shown in the flowchart in FIG. 2.

As explained above, in embodiment 1 of the present invention, an image is corrected to achieve a color tone equivalent to the color tone of an image when the natural color of the object is gray and the illuminating light is flat. In embodiment 2, the barycentric values of the histograms can be converted with a high degree of flexibility to achieve an image correction in a desirable manner while retaining the impression of the color tone of the illuminating light used during the photographing operation even when the prerequisite hypothesis of embodiment 1, i.e., the hypothesis that the most desirable image is achieved when the illuminating light has a flat spectrum, is not valid, since the image is photographed under illumination conditions manifesting a unique color tone. Through examples 1 and 2, in which quadratic functions are used for histogram conversion, the brightness levels can be smoothly converted to obtain a corrected image that is pleasing to the eye.

While the explanation is given in reference to the embodiments above on an example in which the image correction program and the installation program for installing the image correction program are provided in a recording medium constituted of the CD ROM 13, the recording medium may be constituted of any other form of memory. All types of recording media including magnetic tape, DVD and the like may be employed in the present invention.

In addition, these programs may be provided via a transmission medium such as a communication line, a typical example of which is the Internet. In other words, the programs may be converted to signals on a carrier wave that transmits through the transmission medium and be transmitted. A computer 1 in FIG. 5 is provided with a communication interface 21 connected to a communication line 22. A computer 23 is a server that provides the image correction program in which the image correction program is stored. The communication line 22 may be a communication line for Internet connection or a communication line for a personal computer, or it may be a dedicated communication line. The communication line 22 may be a telephone line or a wireless telephone line such as a mobile telephone line.

What is claimed is:

1. An image correction apparatus comprising:
an image obtaining unit that obtains image data from outside constituted of a plurality of pixels each having a value of a color component among a plurality of color components;
an average value calculation unit that calculates average values of color component values of pixels corresponding to individual color components in said image data;
a correction unit that corrects the color component values of individual pixels to match the average values of the color component values of pixels corresponding to individual color components with at least one specific reference value; and
a stage value calculation unit that determines three or more stage values between the average value of the color component values and a specified reference value for each of said plurality of color components, a number of stage values being identical to each other among said plurality of color components, wherein:
said correction unit respectively sets stage values having an common order number among said plurality of color components as reference values for said plurality of color components and corrects color component values of individual pixels to match the average values of the color component values corresponding to individual color components with said reference values set for the individual color components.

* * * * *